United States Patent [19]

Detrick

[11] 4,418,260
[45] Nov. 29, 1983

[54] WOOD TREATING METHOD AND APPARATUS FOR FACILITATING REMOVAL OF FERROUS MATERIALS THEREFROM

[76] Inventor: Jeffrey C. Detrick, 7108 W. 67th St., Overland Park, Kans. 66204

[21] Appl. No.: 312,246

[22] Filed: Oct. 19, 1981

[51] Int. Cl.³ .......................... H05B 6/40; B23P 19/06
[52] U.S. Cl. .............................. 219/10.43; 219/10.41; 219/10.57; 219/10.67; 219/10.79; 29/403.4; 29/426.1
[58] Field of Search .............. 219/10.41, 10.43, 10.57, 219/10.79, 10.71, 10.67; 29/403.4, 426.1, 426.4

[56] References Cited

U.S. PATENT DOCUMENTS

| | | | |
|---|---|---|---|
| 1,385,079 | 7/1921 | Jones . | |
| 1,569,397 | 1/1926 | Robertson . | |
| 2,291,862 | 8/1942 | Bailey | 219/10.57 X |
| 2,513,431 | 7/1950 | Sell . | |
| 2,593,843 | 4/1952 | Cannon | 29/426 X |
| 2,699,483 | 1/1955 | Arnolt . | |
| 2,711,984 | 6/1955 | Kingman | 219/10.79 X |
| 3,697,715 | 10/1972 | Morris et al. | 219/10.43 |
| 3,731,040 | 5/1973 | Kasper | 219/10.79 |
| 3,771,209 | 11/1973 | Bennett, Jr. | 219/10.57 X |
| 4,258,241 | 3/1981 | Soworowski | 219/10.79 X |
| 4,300,031 | 11/1981 | Reboux et al. | 219/10.79 X |

FOREIGN PATENT DOCUMENTS 577830  6/1946  United Kingdom .

Primary Examiner—B. A. Reynolds
Assistant Examiner—Philip H. Leung
Attorney, Agent, or Firm—Schmidt, Johnson, Hovey & Williams

[57] ABSTRACT

Pallet nails are subjected to induction heating to char the wood therearound. A pair of induction coils are brought into engagement with the frame pieces of the pallet and with the boards nailed to the frame pieces such as to place the nails within the eddy currents of the electric radio frequency field surrounding the coils. The nails become red hot instantaneously and within a matter of a few seconds the wood is so fully charred along the nails that they either fall from place or can be easily and quickly removed from the soft, highly porous charred substances.

16 Claims, 9 Drawing Figures

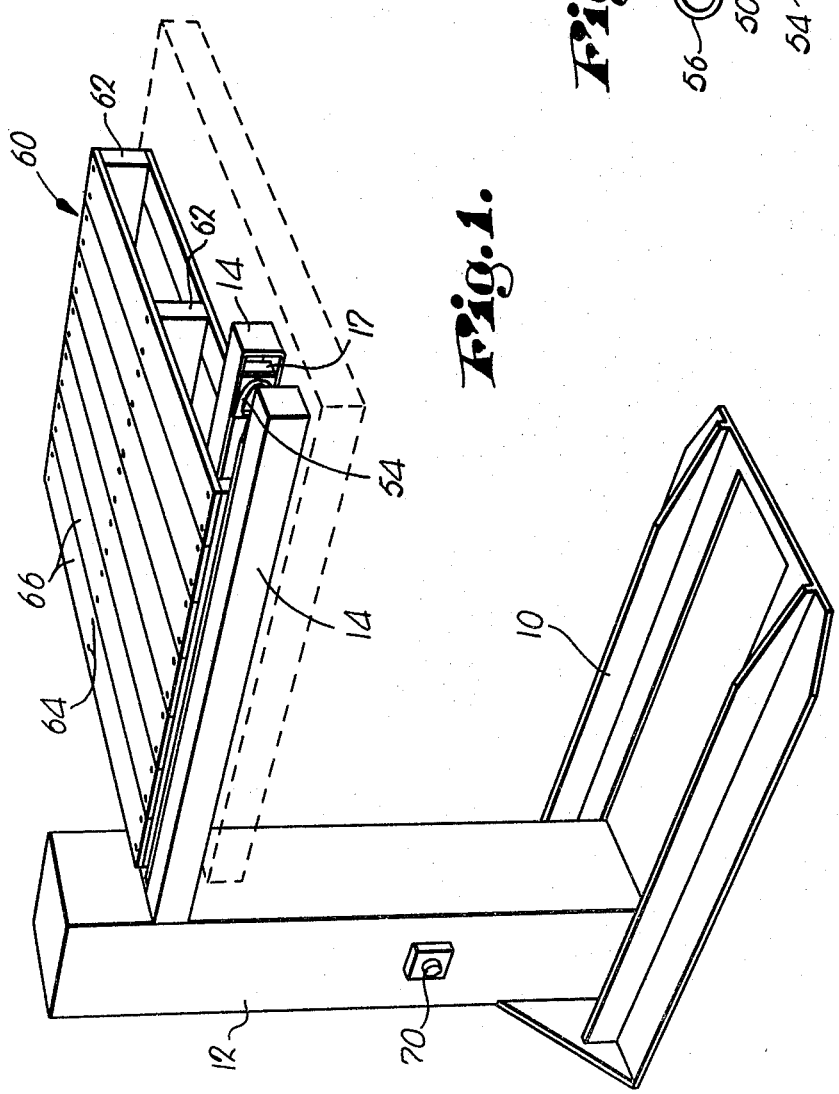
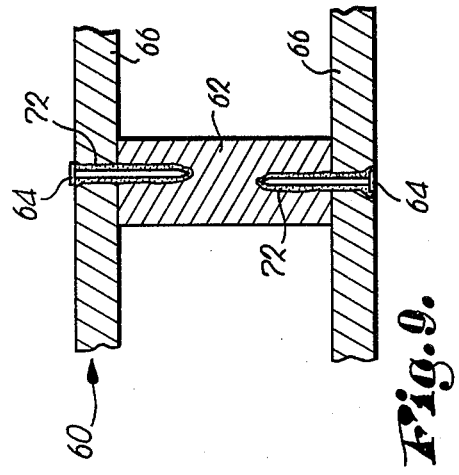
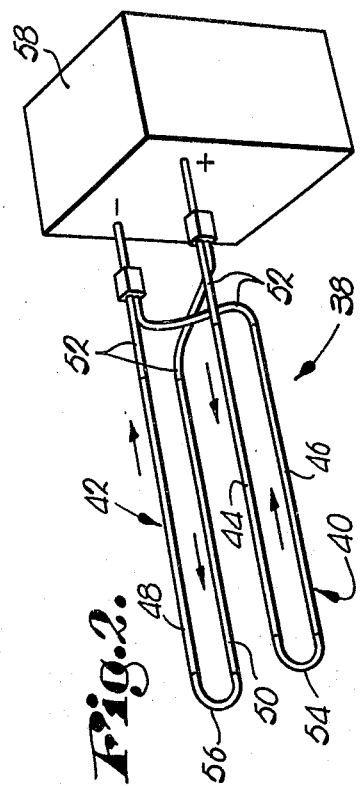
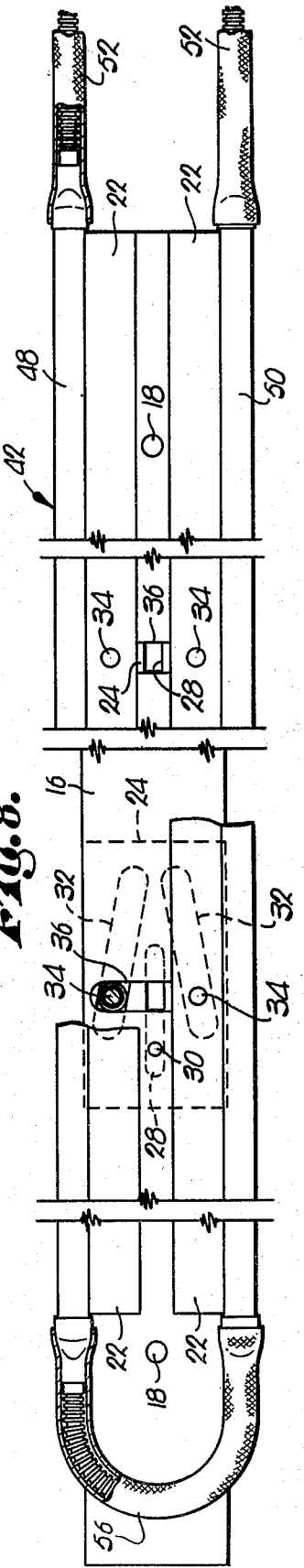

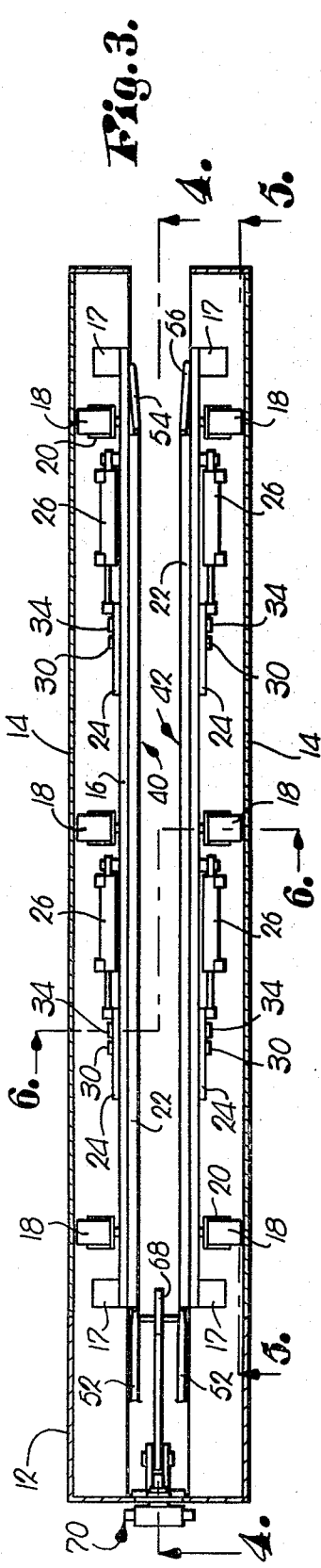
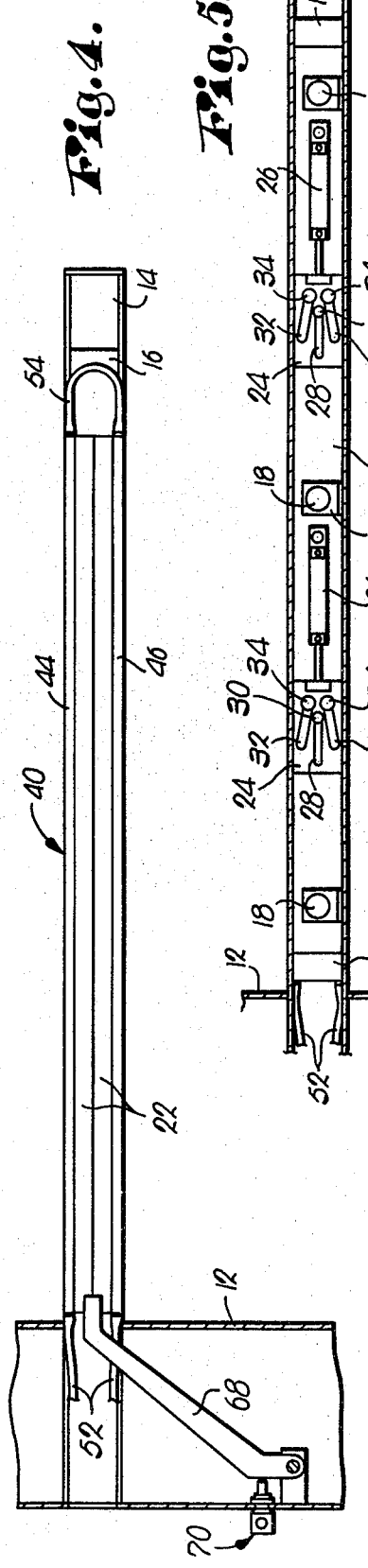
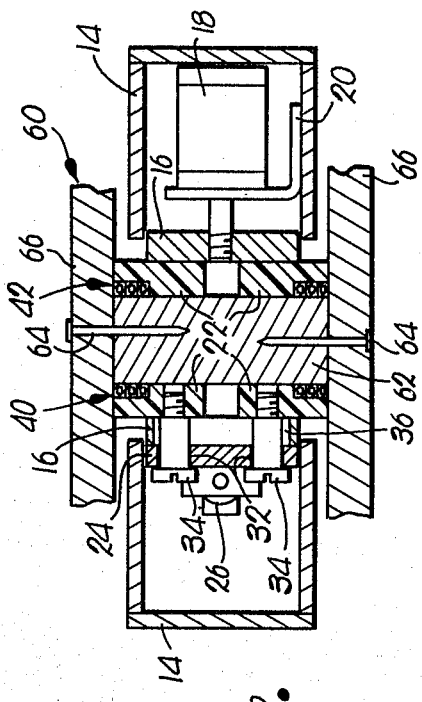
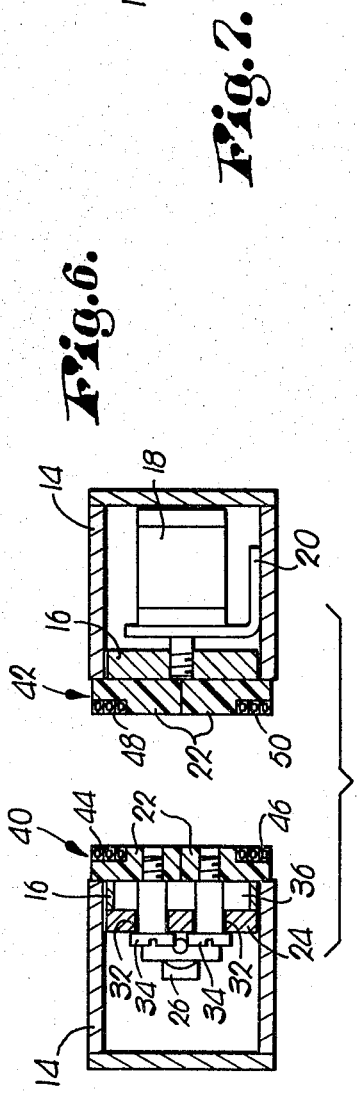

WOOD TREATING METHOD AND APPARATUS FOR FACILITATING REMOVAL OF FERROUS MATERIALS THEREFROM

The concepts of my present invention have advantageous use, for example only, in the partial or complete disassembly of portable platforms, commonly referred to as "pallets", usually made of wood and employed to handle, store and/or move materials and packages in warehouses, factories and vehicles. They normally consist of a number of spaced frame pieces and a plurality of top and bottom boards or stringers, oftentimes held in place by screw nails applied by pneumatic hammers.

Most all goods are today shipped on such pallets with the initial cost averaging from $8.00 to $18.00, and many are much more expensive. Multitudes are discarded daily, particularly if damaged, because the cost of repair renders reuse somewhat impractical. Moreover, disassembly to salvage the valuable hardwood (usually oak) is most difficult and expensive.

As a consequence, millions of board feet of lumber and millions of dollars are lost each year, jamming trash containers, clogging landfills (requiring 12-14 years to decompose) and increasing trash collection costs. Such wasteful disposition of a limited lumber supply necessitates a rapid and inexpensive way to disassemble the pallets, either for repair, for rebuilding or for reintroduction of the wood materials into the market for other useful purposes.

While attempts have been made to solve the problem beyond mere use of the hammer and crowbar, equipment available for such disassembly purposes is quite expensive and their speeds of operation are not such as to render the venture entirely satisfactory from a cost standpoint, especially when considering the outlays for shipment of the used pallets to and from a central location.

Accordingly, one of the important attributes of the present invention is the fact that my apparatus is sufficiently inexpensive to permit lease or ownership by the pallet users themselves. Moreover, pallet disassembly becomes so simple and rapid that no special skills are required and operational costs are somewhat minimal. The nails or other fasteners are heated by an electric current that is caused to flow therethrough by electromagnetic induction. This, in turn, causes the wood around the fasteners to become charred to such extent as to render the nails easily removed, the pallet thereby falling apart with the need for application of very little force.

In the drawings:

FIG. 1 is a perspective view of the apparatus forming the subject matter of my present invention shown in association with a pallet to be treated thereby;

FIG. 2 is a schematic view illustrating the relative positioning of the induction coils;

FIG. 3 is a horizontal, cross-sectional view through the apparatus shown in FIG. 1 taken immediately below the top plates of the standard and the supporting arm;

FIG. 4 is a fragmentary, cross-sectional view taken on line 4-4 of FIG. 3;

FIG. 5 is a fragmentary, cross-sectional view taken on line 5—5 of FIG. 3;

FIG. 6 is a cross-sectional view taken on irregular lines 6—6 of FIG. 3;

FIG. 7 is a view similar to FIG. 6 showing relative positions of parts while employed in association with the pallet to heat the nails and char the wood therearound;

FIG. 8 is an enlarged view similar to FIG. 5 showing the spreading mechanism in association with one of the coils; and FIG. 9 is a fragmentary, detailed, cross-sectional view through the pallet illustrating its condition at zones around the nails after treatment.

The apparatus chosen for illustration of the principles of my present invention as shown in FIG. 1 of the drawings includes a suitable base 10 supporting a hollow standard 12 at one of its ends, and a pair of channel-shaped arms 14 extend from the standard 12 into spaced overlying relationship to the base 10.

The horizontally spaced parallel arms 14 open inwardly toward each other, and each arm 14 carries an elongated, longitudinally extending slide plate 16 having guides 17 rigidly attached to its ends. The plate 16 is shifted laterally by a number of actuators 18 housed within the arm 14 and mounted on brackets 20. The actuators 18 may take the form of fluid pressure piston and cylinder assemblies (pneumatic or hydraulic) for reciprocating the plates 16 from the normal position within the arms 14 as shown in FIG. 6 to the outwardly extended position shown in FIG. 7.

A pair of elongated strips 22, normally in edge-to-edge interengagement as shown in FIG. 6, and disposed exteriorly of the arms 14, slidably engage the outer face of each plate 16 respectively for vertical movement away from each other as depicted in FIG. 7.

A pair of slide blocks 24 engage the inner face of each plate 16 respectively and each block 24 is, in turn, reciprocated longitudinally of the plate 16 by an actuator 26 which may be of the same type and nature as the actuators 18. Each block 24 is guided by a horizontal slot 28 therein receiving a pin 30 which extends rigidly into the proximal plate 16.

Each block 24 also has a pair of relatively converging slots 32 and each slot 32 receives a pin 34 that extends freely through a vertical clearance slot 36 in the corresponding plate 16. In each assembly one pin 32 is rigidly attached to the upper strip 22 and the other pin 32 extends similarly into the lower strip 22.

Induction coil means 38 carried by the inner faces of the strips 22 include a pair of loops 40 and a pair of loops 42. The loop 40 has an upper stretch 44 along the upper edge of a first strip 22 and a lower stretch 46 along the lower edge of a second strip 22. The loop 42, in the same manner, has an upper stretch 48 along the upper edge of a third strip 22 and a lower stretch 50 along the lower edge of a fourth strip 22.

Each stretch 44-50 has an exteriorly insulated, flexible electrical conductor tube 52 at one end thereof extending beyond the corresponding strips 22. An arcuate, exteriorly insulated, flexible, electrical conductor tube 54 joins the tubular, electrical conductor stretches 44 and 46, and a similar tube 56 joins the tubular, electrical conductor stretches 48 and 50 beyond the opposite ends of the strips 22. Each stretch 44-50 includes three superimposed, metal (e.g. copper) square tubes individually wrapped with, for example, fiberglass tape, and the composite is then enclosed within an epoxy resin or the like. Accordingly a coolant may be circulated continuously through each loop 40, 42 of the tubular construction of the coil means 38 from a supply tank and pump (not shown) which may, if desired, be housed within the standard 12.

A radio-frequency generator (not shown) is provided within a casing 58, such generator having a rectifier, which may be coupled with a source of alternating current, such as 60-cycle, for converting such current into direct current. Additionally, there is provided an oscillator for converting the direct current into radio-frequency power supplied to the coil means 38, causing the flow of eddy currents around each of the stretches 44-50 throughout their lengths from one end to the opposite end of each of the strips 22. For the most part, a generator within the power range of about 0.1-kw to 1000-kw will be found to be satisfactory for all needs contemplated by my present invention. Except for the conductors of the coil means 38, all parts, especially within the zones of the eddy currents, should be made from non-ferrous, non-carbonaceous materials.

One important application is in connection with a pallet 60, as shown in FIGS. 1, 7 and 9, of the kind which has a number of frame pieces 62 (usually 2"×4") to which are attached by fasteners 64 (normally nails of ferrous materials) a plurality of stringers 66 which, as in the case of the pieces 62, are normally of wood or the like having carbonaceous characteristics.

OPERATION

In FIGS. 1 and 7 the pallet 60 is shown with one frame piece 62 between the two pairs of strips 22 and, therefore, between the loops 40 and 42 of coil means 38. The proximal ends of the upper and lower stringers 66 have the strips 22 and coil 38 disposed therebetween. As the pallet 60 is so inserted, it engages a swingable member 68 (FIGS. 3 and 4) which, in turn, actuates a control 70. This effects operation of a system which includes a timer 72 (FIG. 1), associated control valves for the pressurized fluids for power devices 18 and 26, switches, relays and the like, (not shown) such systems, of itself, forming no part of my present invention.

Actuation of the devices 18 moves the strips 22 from the position shown in FIG. 6 to points of engagement with the sides of the frame piece 66 (FIG. 7) and actuation of the devices 26 moves the strips 22 such as to position the loops 40 and 42 in close relationship to the nails 64.

As the generator is energized, the eddy currents flowing through the nails 64 raise their temperature to a very hot red glow almost immediately and, within a matter of about 2 to 120 seconds, by thermal conduction from the nails 64, the wood is formed into a charred substance 72 around each nail 64 (FIG. 9), usually containing from about 85% to 95% carbon. Thereafter, the nails 64 either fall from place or can be quickly removed with ease.

The power requirements of the generator, the needed temperature rise in the nails 64, the porosity of the otherwise solid substance 72 and the desired time limits all depend on many factors. These include the kind of structure and wood or other carbonaceous material being treated, its age, hardness and moisture content, the conductivity, size, type and metal content of the fasteners 64 being heated, extent of charring desired and the rapidity needed for completion of each step of each operation.

For the most part, if the temperature of the fasteners is raised to about 200 to 500 degrees Centigrade, virtually all carbonaceous materials will char sufficiently around the fasteners within the time limits herein contemplated as to serve the purposes above outlined regardless of the size, nature and condition of such materials and the fasteners, rusty or otherwise.

My invention makes possible the use of multiple pairs of induction coils such as to treat all frame pieces of a pallet or the like simultaneously as well as conveyors for automatic handling of the pallets and automated ancilliary equipment for quick nail removal and disassembly after completion of the induction heating method above outlined.

I claim:

1. Apparatus for facilitating removal of a plurality of metallic nails from a pallet having a number of spaced, elongated, wood frame pieces each provided with a pair of opposed, longitudinally-extending sides and a pair of longitudinally-extending edges, together with a series of wood members each having an inner and an outer surface, said inner surfaces being held in engagement with a corresponding one of said edges by said fasteners extending through the members and into the frame pieces, said apparatus including:
   induction coil means having a pair of elongated loops,
   said loops being spaced apart for reception of one of said frame pieces therebetween with one loop extending along one of said sides thereof and the other loop extending along the other of said sides thereof adjacent a portion of the fasteners extending beyond the proximal members into the one frame piece,
   whereby, upon generation of sufficient heat by said coil means, the temperature of the fasteners is raised to such extent as to cause the wood surrounding such fasteners to become charred, rendering the fasteners easily removed from said proximal members and said one frame piece.

2. The invention of claim 1; and means for shifting the loops toward the one frame piece after the latter is placed therebetween.

3. The invention of claim 2, said means being adapted to hold the loops into engagement with said sides of the one frame piece during said generation of heat.

4. The invention of claim 2; and means for shifting the loops toward the inner surfaces of said proximal members after the one frame piece is placed therebetween.

5. The invention of claim 4, said means for shifting the loops toward the one frame piece being adapted to hold the loops into engagement with said sides of the one frame piece during said generation of heat.

6. The invention of claim 5, said means for shifting the loops toward said inner surfaces being adapted to hold the loops into engagement with the inner surfaces during said generation of heat.

7. Apparatus for facilitating removal of metallic fasteners from pallets of the kind having a pair of opposed layers of elongated, wood stringers and a number of spaced, elongated wood frame pieces between the layers, each frame piece having a pair of opposed, longitudinally extending sides, the stringers having inner faces engaging the frame pieces and having the fasteners extending into and attaching the same to the frame pieces, said apparatus including:
   induction coil means having a pair of elongated, opposed, spaced loops shiftable toward and away from each other, normally disposed to receive one of said frame pieces therebetween and extending at least the full length of said one frame piece,
   each loop having a pair of opposed, spaced stretches coextensive in length therewith and shiftable toward and away from each other;

primary means for shifting the stretches into engagement with said sides of the one frame piece; and secondary means for shifting the stretches into engagement with said faces of the stringers whereby, upon generation of sufficient heat by said coil means, the temperature of the fasteners extending into the one frame piece is raised to such extent as to cause the wood surrounding the fasteners to become charred, rendering such fasteners easily removed.

8. The invention of claim 7 wherein is provided two pairs of elongated, spaced apart strips each supporting one of said stretches and shiftable toward and away from each other, said secondary means being operably connected with said strips.

9. The invention of claim 8 wherein is provided an elongated piece supporting each pair of strips respectively, said primary means being operably connected with said plates.

10. The invention of claim 9 wherein is provided a pair of elongated, spaced supports for said primary means.

11. The invention of claim 10, said primary means including a plurality of actuators carried by the supports each having a reciprocable member attached to a corresponding plate.

12. The invention of claim 11, said secondary means including an actuator carried by each plate respectively, each having a reciprocable member operably coupled with one corresponding pair of said strips.

13. A method of facilitating removal of a metallic fastener from a structure having an elongated, wood frame piece provided with a pair of opposed, longitudinally-extending sides and a pair of longitudinally-extending edges, together with a wood member having an inner and an outer surface, said inner surface being held in engagement with one of said edges by said fastener extending through the member and into the frame piece, said method including the steps of:

inserting the frame piece between a pair of spaced loops forming a part of induction coil means such that one loop extends along one of said sides and the other loop extends along the other of said sides adjacent a portion of the fastener extending beyond the member into the frame piece; and generating heat in said coil means to raise the temperature of the fastener to such extent as to cause the wood surrounding the fastener to become charred, rendering the fastener easily removed from the member and the frame piece.

14. The invention of claim 13; and shifting the coils against said sides prior to said generation of heat.

15. The invention of claim 13; and shifting the coils against said inner surface prior to said generation of heat.

16. The invention of claim 15; and shifting the coils against said sides prior to said generation of heat.

* * * * *